US008634640B2

(12) United States Patent
Bhatti et al.

(10) Patent No.: US 8,634,640 B2
(45) Date of Patent: Jan. 21, 2014

(54) METHOD AND APPARATUS FOR SELECTING A COLOR PALETTE

(75) Inventors: Nina Bhatti, Los Altos, CA (US); Joanna Marguier, Lausanne (CH); Sabine Susstrunk, Lausanne (CH); Henry Harlyn Baker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 472 days.

(21) Appl. No.: 12/909,378

(22) Filed: Oct. 21, 2010

(65) Prior Publication Data

US 2012/0099788 A1   Apr. 26, 2012

(51) Int. Cl.
*G06K 9/00* (2006.01)

(52) U.S. Cl.
USPC .......................................................... 382/167

(58) Field of Classification Search
USPC .......................................................... 382/167
See application file for complete search history.

(56) References Cited

U.S. PATENT DOCUMENTS

| 6,328,567 | B1 * | 12/2001 | Morris et al. ................. 433/215 |
| 6,518,981 | B2 | 2/2003 | Zhao et al. |
| 6,519,360 | B1 | 2/2003 | Tanaka |
| 6,563,510 | B1 * | 5/2003 | Rice et al. ...................... 345/593 |
| 6,873,727 | B2 * | 3/2005 | Lopez et al. ................... 382/162 |
| 6,980,221 | B2 | 12/2005 | Spaulding et al. |
| 7,215,825 | B2 * | 5/2007 | Sugimoto et al. ............. 382/274 |
| 7,522,767 | B2 | 4/2009 | Baker et al. |
| 7,522,769 | B2 | 4/2009 | Harville et al. |
| 8,044,969 | B2 * | 10/2011 | Osorio et al. .................. 345/604 |
| 8,179,576 | B2 * | 5/2012 | Hayashi ......................... 358/520 |
| 8,274,696 | B2 * | 9/2012 | Yoneda ........................... 358/1.9 |
| 8,369,625 | B2 * | 2/2013 | Kim et al. ....................... 382/224 |
| 2002/0048400 | A1 * | 4/2002 | Leedham et al. ............. 382/167 |
| 2004/0135790 | A1 * | 7/2004 | Moore ........................... 345/589 |
| 2008/0007749 | A1 * | 1/2008 | Woolfe ........................... 358/1.9 |
| 2012/0099788 | A1 * | 4/2012 | Bhatti et al. ................... 382/167 |

FOREIGN PATENT DOCUMENTS

| JP | 9147098 (A) | 6/1997 | |
| JP | 2005212246 A | * 8/2005 | ............... B41J 2/525 |

OTHER PUBLICATIONS

Jackowski, M., et al, Correcting the Geometry and Color of Digital Images, Oct. 1997, IEEE Transactions on Pattern Analysis and Machine Intelligence, vol. 18, pp. 1-7.*

Marguier, J. et al, Color Correction of Uncalibrated Images for the Classification of Human Skin Color, 2007, In Proc. of the 15th Color Imaging Conference, pp. 1-5.*

"Using Online Tools to Decorate Your Home," Grace Bonney (from Design*Sponge) May 24, 2010 downloaded from http://mylifescoop.com/featured-stories/2010/05/using-online-tools-to-decorate-your-home.html?page=3 on Sep. 20, 2010.

(Continued)

*Primary Examiner* — Utpal Shah

(57) ABSTRACT

A method for selecting a color palette includes receiving a feature from an image of an object and a reference color chart, calculating a transform to correct a color in the imaged reference color chart, correcting a color in the feature using the transform, and selecting a color palette based on the corrected feature color. The reference color chart includes reference colors, and the transform corrects the color in the imaged reference color chart to substantially equal a corresponding reference color. An apparatus for selecting a color palette is also described.

20 Claims, 7 Drawing Sheets

(56) References Cited

OTHER PUBLICATIONS

"A World of Color Revealed on iPhone: Benjamin Moore Develops App to Digitally Match Colors," Montvale, NJ—May 2009 downloaded from http://www.designspongeonline.com/2009/06/iphone-paint-apps.html on Sep. 20, 2010.

Color Snap; Sherwin-Williams downloaded from http://www.sherwin-williams.com/do_it_yourself/paint_colors/paint_color_palette/colorsnap/index.jsp on Sep. 20, 2010.

"Color Sutra Takes the Guesswork Out of Matching Colors," downloaded from http://www.colorsutra.com/ on Sep. 20, 2010.

"Colour Click" downloaded from http://www.dulux.co.uk/colours/colourclick/index.jsp on Sep. 21, 2010.

* cited by examiner

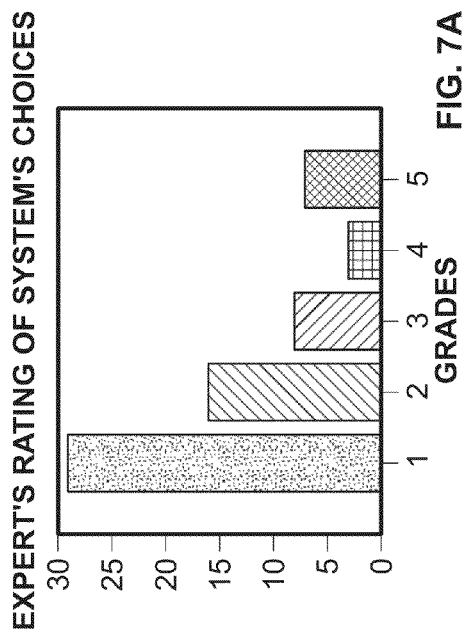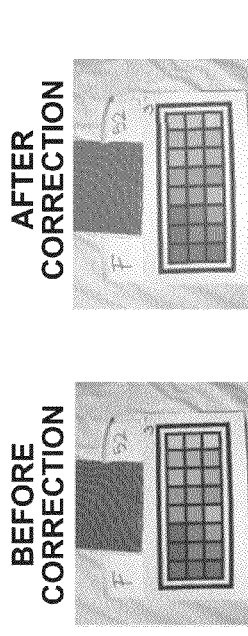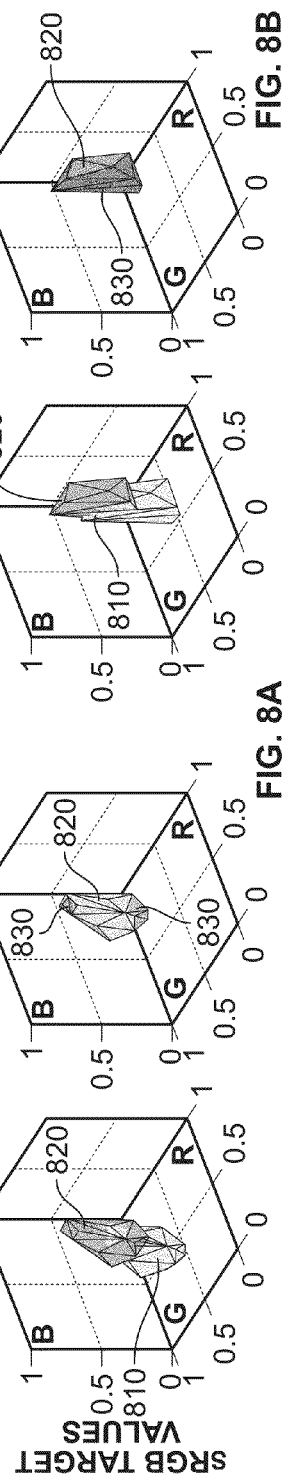

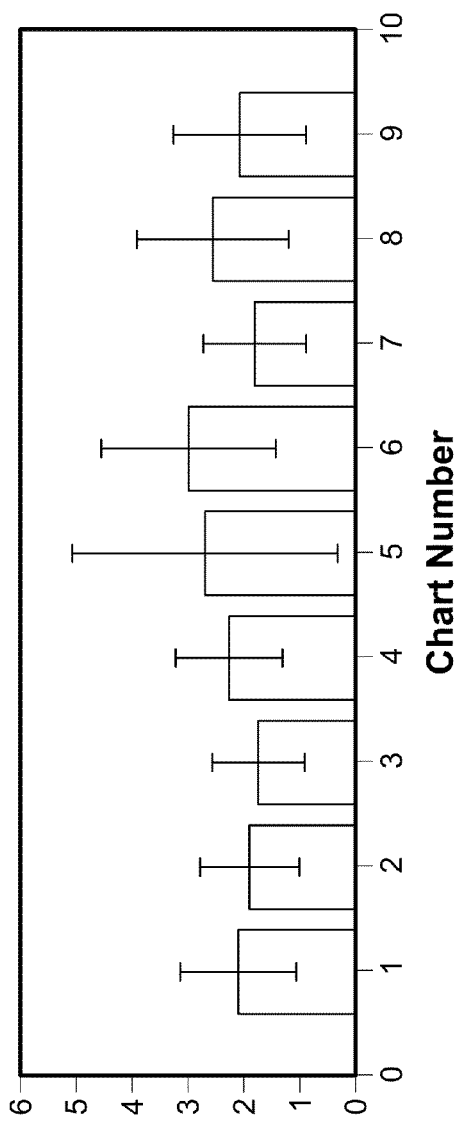
FIG. 9
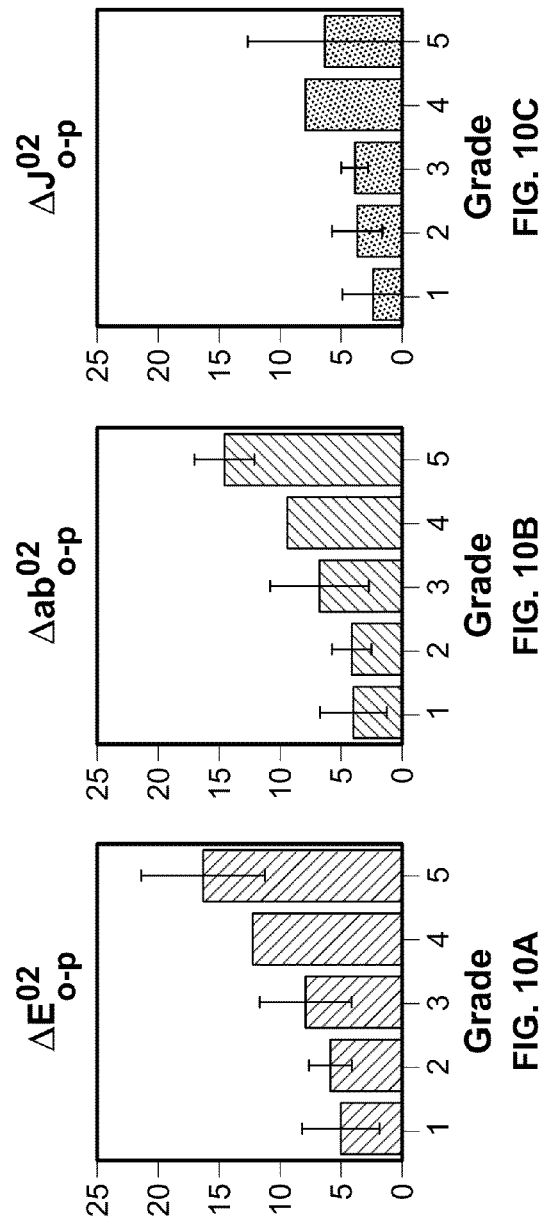
FIG. 10A
FIG. 10B
FIG. 10C

METHOD AND APPARATUS FOR SELECTING A COLOR PALETTE

BACKGROUND

Digital cameras are ubiquitous, especially with their integration into cell phones. However, because of differences in lighting, the variability of cameras, and other factors, assessing the actual colors of objects in these digital camera images may be difficult. For example, the same scene imaged with different devices can result in quite different color images due to imperfect illuminant compensation and variable camera characteristics.

Sometimes when at home or out shopping it may be helpful to match colors or textures of objects or clothes at home or in a store with different finishes or paint or apparel colors, but the limitations of the lighting or the camera may produce inaccurate object colors and thus inaccurate color sensing. People often have difficulty remembering colors, so in situ measurement of object color can assist in home or office interior or exterior decoration or in selecting apparel and other items that require color accuracy and judgment.

BRIEF DESCRIPTION OF THE DRAWINGS

FIGS. 7A and 7B are bar graphs showing occurrence of grades of evaluation according to embodiments of the invention;

FIGS. 8A and 8B show examples of two objects before and after correction according to embodiments of the invention;

FIG. 9 shows the color correction $\Delta E_{02}$ errors for each reference chart according to embodiments of the invention;

FIGS. 10A-10C are bar graphs showing differences between object and paint colors according to embodiments of the invention.

Figure 1A:
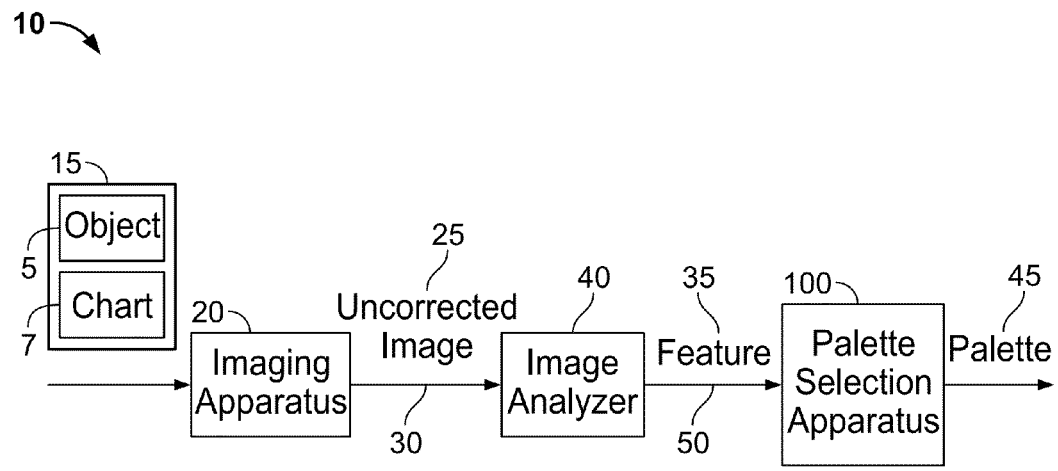
FIG. 1A is a conceptual block diagram of a system including a palette selection apparatus according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used in a variety of applications. Although the present invention is not limited in this respect, the techniques disclosed herein may be used in or with cameras and other imaging devices, cell phones, personal digital assistants (PDAs), mobile applications, laptop and PC computers, web-based imaging services, scanners, inkjet and laser printers, photo printers, multi-function printers, copiers, and the like.

Color judgment and matching are often desired in an interior or exterior decoration or fashion or apparel situation. A homeowner may want to paint a room that contains an object, such as a piece of furniture, a rug, a painting, etc., having a specific color or finish, and may want to match the paint to that specific color or finish. Sometimes the object has multiple colors or textures or aspects (collectively called "features") that the homeowner desires to match. Similarly, a consumer may want to choose clothes that match the color or colors or features of an accessory or choose an accessory that matches the colors or features of the clothes. However, it is difficult to accurately assign a color from a digital image, even if a camera has been previously calibrated. Embodiments of the present invention allow a user to perform such matching using any digital imaging device, such as a digital camera or cell phone, under varying light conditions, and reliably match a paint, finish, or fabric color to the specific color within a feature of such object. In addition, embodiments of the present invention provide a user with a color palette for selecting complementary paints, finishes, or fabrics to go with such object features.

Such color matching may be performed by imaging the object along with a calibrated reference color chart (or reference color set), correcting the color of the object (or object feature) based on the differences between the imaged reference chart and the actual reference chart, and then choosing a color palette to complement the corrected color.

Reference is now made to FIG. 1A, which is a conceptual block diagram of a system 10 including a palette selection apparatus 100 according to embodiments of the invention. System 10 may include imaging apparatus 20, image analyzer 40, and palette selection apparatus 100. Imaging apparatus 20 may image scene 15, which may be made up of object 5 and reference chart 7, to create uncorrected image 25. Uncorrected image 25 may be transmitted to image analyzer 40 over a connection 30, and image analyzer 40 may provide feature 35 to palette selection apparatus 100 over a connection 50. Palette selection apparatus 100 may take feature 35 and produce a palette 45.

Connections 30 and/or 50 may be wired or wireless connections, and may include a telephone (e.g., cellular, public switched, etc.) network and/or a computer network, such as a LAN (local area network), a WAN (wide area network), or the Internet. Connections 30 and/or 50 may not even involve a network, but may be close, wired or wireless connections found within the system or device containing imaging apparatus 20, image analyzer 40, and palette selection apparatus 100. In such an arrangement, imaging apparatus 20, image analyzer 40, and palette selection apparatus 100 could be part of a computer, a PDA, a mobile phone, a scanner/printer or scanner/copier or other system or device. Connections 30 and/or 50 could also include a file transfer system, such as a portable file system such as a CD, DVD, or thumb or flash drive, which contains uncorrected image 25 or feature 35 which is then input to image analyzer 40 or palette selection apparatus 100 (as discussed below).

Imaging apparatus 20 may be a digital camera (high or low resolution), a digital scanner to scan a photograph, a video camera, a copy machine, or a webcam, just to name a few examples of imagers.

Image analyzer 40 may look at uncorrected image 25 and determine different features of uncorrected image 25 that may be chosen for color correction. For example, an object may have many colors, textures, patterns, or finishes, and image analyzer 40 may identify each one and provide each to palette selection apparatus 100 for palette selection. Textiles may have a weaving pattern and varying colors, mosaics could have different colors or finishes, and paintings or tapestries may have different colors, textures, or patterns. Image analyzer 40 may offer the user the chance to select one or more features to match, such as by identifying a feature with a box that the user can select. An example could be a tapestry having a texture, a pattern, and a background color and showing different scenes using different colors, and image analyzer 40 may identify for matching the texture, the pattern, the background color, and/or colors from different scenes. In another example, a flower could be depicted in a painting, and image analyzer 40 could identify the color or texture of the stem, petal, or center for matching. In a further example, image analyzer 40 could identify all the colors within uncorrected image 25 and prepare a histogram, from which the user can choose which colors he or she wants to match.

In other embodiments, a user may want to match the overall color of an object, in which case image analyzer 40 may not be used at all, and uncorrected image 25 could be input directly to palette selection apparatus 100 to match the average color of object 5.

Figure 1B:
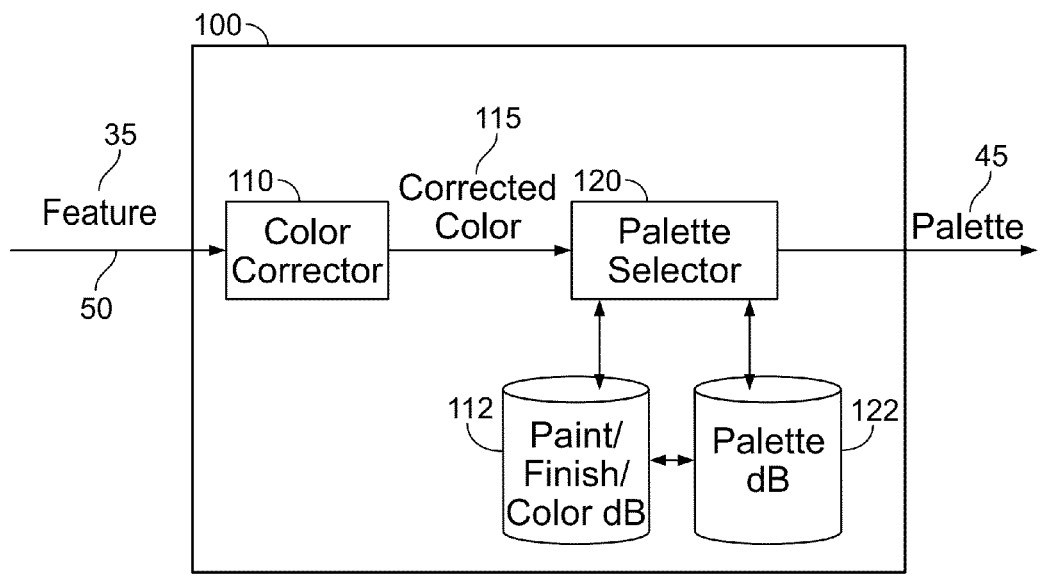
FIG. 1B is a conceptual block diagram of the palette selection apparatus of FIG. 1A according to embodiments of the invention.

Palette selection apparatus 100 may include color corrector 110 and palette selector 120, as shown in FIG. 1B. Color corrector 110 may take as an input feature 35 (or uncorrected image 25 if there is no image analyzer 40) via connection 50 and produce corrected color 115, using various correction algorithms. Corrected color 115 may then be input to palette selector 120, which may produce palette 45, using databases 112 and 122, which may be databases of paints, finishes, colors, and color coordinated palettes designed by an interior designer, exterior designer, fashion designer, or other expert.

The parts and blocks shown in FIGS. 1A and 1B are examples of parts that may comprise system 10 and palette selection apparatus 100, and do not limit the parts or modules that may be part of or connected to or associated with system 10 and palette selection apparatus 100. For example, although color corrector 110 and palette selector 120 are shown within box 100, they may reside in different physical "boxes" or devices, and the connection between them may be wired or wireless, via physically close connections or over a network, in a manner similar to connection 30. And, as mentioned above, image analyzer 40 may not be used at all if a user wants to match the overall color of an object, rather than a specific feature.

An example of how embodiments can be put together and used is now described in more detail. Images can be useful while shopping, so it would be very convenient to simply send an image, for example, over the Internet or via MMS (multimedia messaging service), and get expert advice in return on interior or exterior decoration or fashion. Alternatively, such techniques could be embodied in an application entirely resident on a mobile phone or PDA (e.g., for iPhone or Droid systems). They could also be embodied using a kiosk, which may include both the imaging apparatus and the palette selection apparatus, but may just include the palette selection apparatus.

The following embodiments are described in the setting of home décor, but it is understood that embodiments of the invention can be used in exterior decoration, fashion, apparel, and other applications.

Home décor is an industry that is exceptionally dependent on color assessment and measurement. Home décor requires the selection of interior finish products that, when taken together, form an aesthetically attractive combination. Homeowners often rely on professionals to provide them with expert advice regarding paint, textiles, carpet, flooring, and hard finishes such as marble, granite, and tile. The selection is often overwhelming and the novice may feel paralyzed by the multitude of products. Concepts such as "undertone," "neutral," "contract," and "harmony" are fairly complex to master, and the homeowner may want actionable advice delivered quickly. While paint matching solutions may exist, what is lacking is the ability to determine a palette of colors, i.e., a set of colors that form an aesthetic group and are in keeping with current trends. An objective of these embodiments is to select a palette or palettes that should coordinate well with collected image samples.

A. Principles Behind the Operations

The irradiance falling on a sensor is proportional to the product of $E(x,\lambda)$, the spectral power distribution of the illuminant, and $S(x,\lambda)$, the reflectance spectra of the object or feature. The camera response $\rho_i(x)$ of the ith sensor $R_i(\lambda)$ at spatial position $x=(x,y)$ can be modeled as $$\rho_i(x) = s(x,\lambda)^T \cdot \text{diag}(e(x,\lambda)) \cdot r_i(\lambda), \; i=1:n \quad (1)$$

where the vectors $s(x,\lambda)$, $r_i(\lambda)$, and $e(x,\lambda)$ are, respectively, $S(x,\lambda)$, $R_i(\lambda)$, and $E(x,\lambda)$ represented by 31 samples taken over the visible spectral range. $\text{diag}(e(x,\lambda))$ is a 31×31 matrix with the vector entries $e_i(x,\lambda)$ on its diagonal, and n is the number of channels of the imaging device.

It is not a trivial task to retrieve reflectance values from camera responses, especially when n<<31. For many applications, however, it may be sufficient to retrieve colorimetric values instead of the entire reflectance spectra. The human visual system is unable to recover spectral information, and two objects having the same appearance under a given illuminant can have slightly different reflectance spectra $S(\lambda)$. A three-channel camera is then sufficient to retrieve tri-stimulus values.

Several approaches using RGB (red/green/blue) cameras as colorimeters have been disclosed. One approach, using colorimetry of human teeth as an application, uses a calibrated camera to compute transforms from camera RGB to CIEXYZ (also called "CIE XYZ," a color space) supported by the International Commission on Illumination (Commission Internationale de L'éclairage or CIE)) by either minimizing a cost function in CIELAB (also denoted "CIE L,a,b") space or by minimizing the mean square error in CIEXYZ color space under several selected illuminant conditions. See Wu et al., *Imaging colorimetry using a digital camera*, J. Imaging Sci. Technol., vol. 44, pp. 267-79 (2000). Another approach presents a method to compute 3×3 color transform matrices intended for camera calibration in digital photography by simple least squares regression, white point preserving least squares regression, and weighted white point preserving least squares regression. See P. M. Hubel et al., *Matrix calculations for digital photography*, Proc. of 5th IS&T/SID Color Imaging Conf., pp. 105-111 (1997). This type of approach allows using a calibrated camera as a colorimeter under known illuminant conditions. Other methods including polynomial-based techniques may also be used.

Such calibration methods access the raw data of the sensors, and the resulting color transform is camera dependent. The transform is usually applied prior to the image rendering implemented in the camera.

In embodiments of the present invention, the transform may be applied after color rendering. As such, information about sensor characteristics and in-camera processing is not needed, and a transform for every image may be calculated. These transforms are scene- and camera-dependent.

B. General Approach of the Embodiments

Embodiments of the invention use methods to retrieve color information from digital images taken with a single, casually posed consumer camera under unknown illuminants. The camera may be high or low resolution (i.e., relatively many or few megapixels). The embodiments are applied to consumer applications, such as home décor advice, but can be used with other applications, such as exterior decoration, apparel, and fashion. Users, generally, but certainly not exclusively consumers, are assumed to use an unknown camera in fully automatic mode and under uncontrolled lighting conditions. The camera may perform white-balancing and may encode images in sRGB, which has a defined illuminant of D65.

Due to imperfect illuminant compensation, different sensor responses, and variations in image processing and quality across devices, uniform color rendering is generally not achieved. The resulting image color values of a given scene captured with different uncalibrated cameras or under different lights can have significant variations.

To classify colors consistently, the same object or feature should have similar sRGB pixel values independent of the illuminant and the camera. The embodiment does not access the raw data of the sensors, and there is generally no need for additional information on the automatic in-camera processing. A color transform may thus be computed using known reference values present in the scene in the form of a calibration target (e.g., reference chart 7). The reference colors should be close to the actual color to be corrected, because it is easier to accurately correct a limited range of colors with a given transform.

Figure 2:
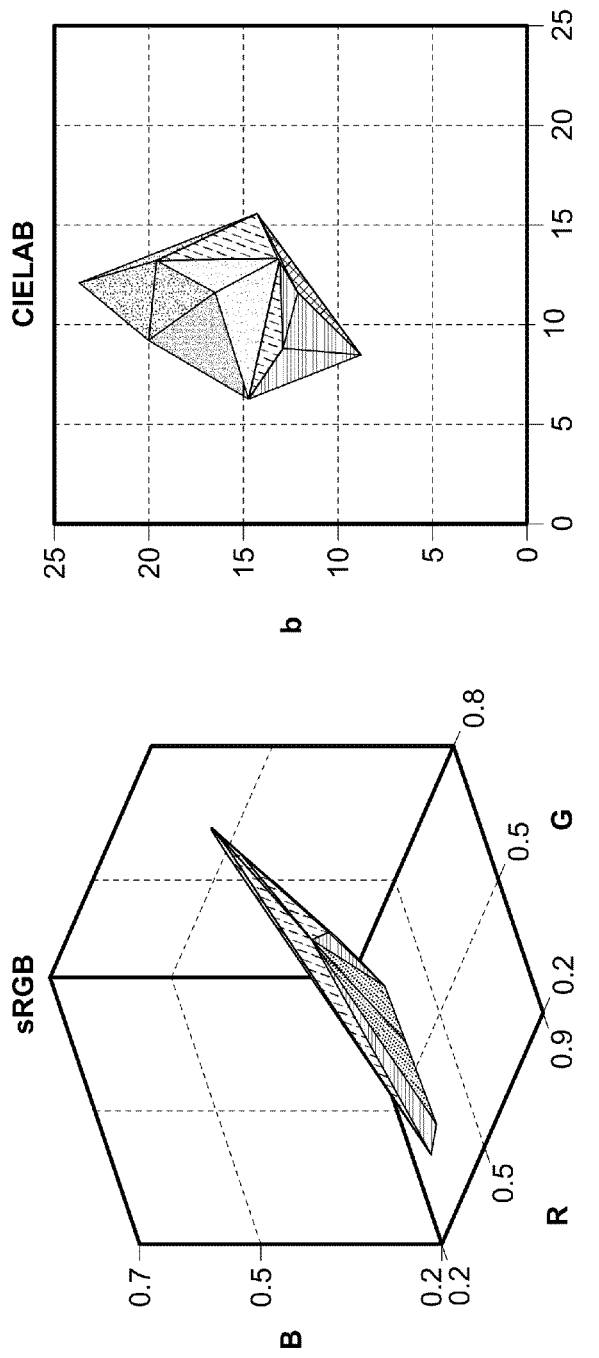
FIG. 2 is a conceptual illustration of color representations for skin tones according to embodiments of the invention.

Previous work of the inventors was targeted towards skin color assessment. See M. Harville, H. Baker, N. Bhatti, and S. Süsstrunk, *Image-based measurement and classification of skin color*, Proc. of IEEE Intl Conf. on Image Process., vol. 2, pp. 374-77 (2005). Using a reference color chart consisting of patches covering the range of possible skin tones, this work demonstrated assessment of skin color with an accuracy under $\Delta E^*_{ab}=1$. See J. Marguier, N. Bhatti, H. Baker, M. Harville, and S. Süsstrunk, *Assessing human skin color from uncalibrated images*, Intl J. Imaging Syst. Technol., special issue on Appl. Color Image Proc., vol. 17(3), pp. 143-151 (2007). Since the gamut of skin tones is limited, any image could be color corrected using a single chart. Skin tones span a hue angle of about 20° in CIELAB. FIG. 2 is a conceptual illustration of color representations for skin tones that shows the color values of the reference chart used for skin color correction covering the range of human skin tones in sRGB and CIE LAB. Considering that skin tones can be color corrected with a single reference chart, it could take roughly 360°/20°=18 charts to correct all hues with a similar accuracy. However, it may not be practical for a user to choose from among so many charts. Since it is easier for people to choose from among general hues or hue classes, in this embodiment, nine charts covering all hues may be used, at some cost in accuracy. In other embodiments, more charts may be used to increase accuracy, recognizing the likely greater effort on the part of the user to choose the chart closest to the desired object color.

Figure 3:
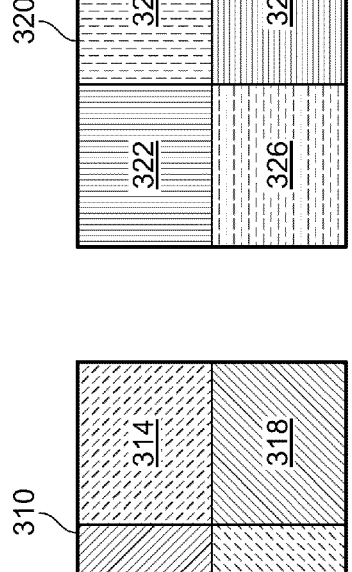
FIG. 3 is a conceptual illustration of color palettes according to embodiments of the invention.

The output of embodiments of the present invention may be a set of colors coordinated with the color of the imaged object or features within the object. The colors may be paints or finishes in a home décor application, or fabric colors in an apparel application. Palette database 122 may consist of palettes of four colors; two examples of palettes are shown in FIG. 3. When the color of the object or feature is determined, that color is found among the color palettes, and the palette containing that determined color is output. For example, color palette 310 may include colors 312, 314, 316, 318, which could be RGB(122,112,191), RGB(185,185,209), RGB(248, 220,210), and RGB(243,237,221), respectively. Color palette 320 may include colors 322, 324, 326, 328, which could be RGB(219,228,106), RGB(244,246,205), RGB(255,219, 183), and RGB(225,138,39), respectively. The desired color in a first object may match (or be close to) color 312 in color palette 310, in which case color palette 310 would be selected. Similarly, the desired color in a second object may match (or be close to) color 328 in color palette 320, in which case color palette 320 would be selected. Although FIG. 3 shows palettes with four colors, palettes having more or less than four colors can also be used.

In embodiments of the present invention, colors do not need to be exactly matched. Rather, the closest matching shade in a color palette can be selected. The palette is the basis for the color coordination recommendation by the system. One metric of success is if an expert would have selected the same matching paint and palette of coordinating colors from the available set. That is, the advice can provide solid guidelines to a user in practical conditions such as what colors to add to a room while keeping an existing design element.

The system may work with fewer than nine charts, and even a single chart having a number of color patches may be used. The patches for such a single chart can be strategically chosen to cover the color spectrum. This would eliminate the effort of the user to choose from among different charts. The system may work under many real conditions, such as limited palettes and non-uniformity of samples.

Figure 4:
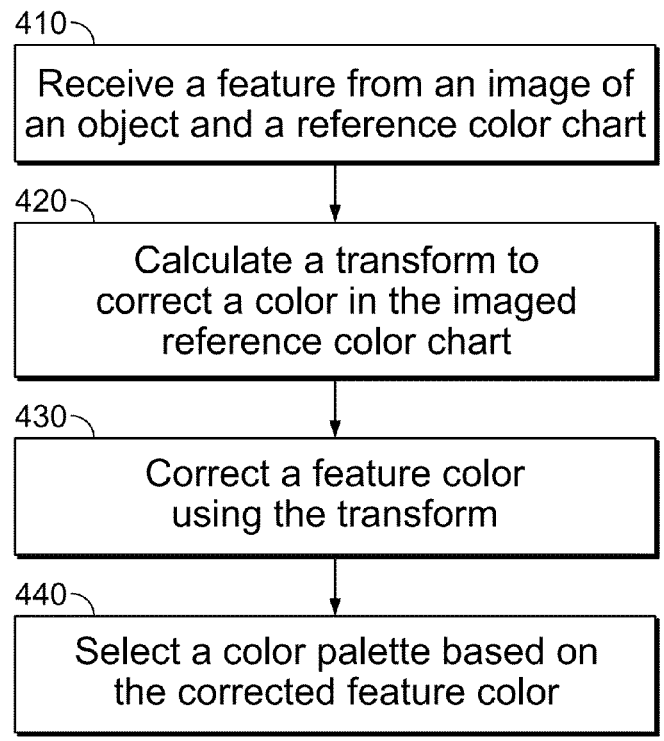
FIG. 4 is a flowchart illustrating general operation of a palette selection apparatus according to embodiments of the invention.

Reference is now made to FIG. 4, which is a flowchart illustrating the general process of palette selection apparatus 100 according to embodiments of the invention. Such a process may include receiving a feature from an image of an object and a reference color chart, where the reference color chart includes reference colors (operation 410). In operation 420, a transform may be calculated to correct a color in the imaged reference color chart to equal the actual corresponding reference color. In operation 430, a feature color may be corrected using the transform. Then, in operation 440, a color palette may be selected based on the corrected feature color. Besides the operations shown in FIG. 4, other operations or series of operations may be used to select a color palette. Moreover, the actual order of the operations in the flowchart may not be critical.

C. Reference Charts

As mentioned above, one embodiment may use a total of nine color correction reference charts, and other embodiments may use more or fewer charts, depending on the degree of accuracy desired and the user's capacity to choose a reference chart. One chart may even be used, as discussed above.

Figure 5:
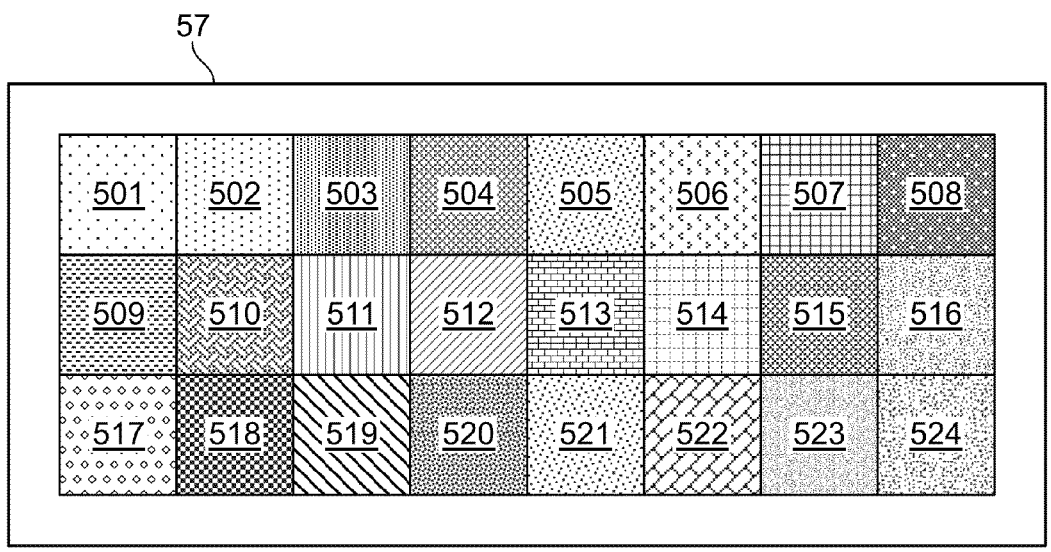
FIG. 5 is a conceptual illustration of a reference color chart according to embodiments of the invention.

In a nine-chart scheme, eight charts may consist of a selection of Munsell Colors covering a hue angle of roughly 60°. An example chart 57, shown in FIG. 5, may contain 24 patches, 501-524. Twenty-one (21) patches may come from seven secondary hues distributed to cover a good range of chroma and lightness, and three patches may be paints extracted from a database, such as paint/color database 112. The range of colors of two adjacent charts may overlap. Charts may be ordered by similar hues to facilitate their use. Since hue is the most natural attribute of color, it makes the choice of the chart by visual matching much simpler for the users. Also, overlapping hues avoids having an object whose color may be in between charts. The ninth chart could consist of 24 paint samples from the paint/color database 112 covering a variety of beiges and browns, colors that are common in home décor and may call for a finer sampling. For other applications, such as exterior design, apparel, or fashion, a different set of charts may be used so as to cover the colors and shades more prevalent in those applications.

A chart may be printed on matte paper, so that it is lambertian. Then the reflectance spectrum of each patch can be measured, which allows first computing CIEXYZ values under illuminant D65 and then sRGB values. With reference to equation (1), $s(\lambda)$ are the target reflectances, $e(\lambda)$ is the standard CIE illuminant D65, and $r_i(\lambda)$ are the 1931 CIE x, y, z color matching functions. The CIEXYZ to sRGB transform is specified in Industry specification IEC 61966-2-1: 1999. *Multimedia systems and equipment, Colour measurement and management, Part 2-1: Colour management*, Default RGB colour space, sRGB.

D. Detailed Example

Figure 6:
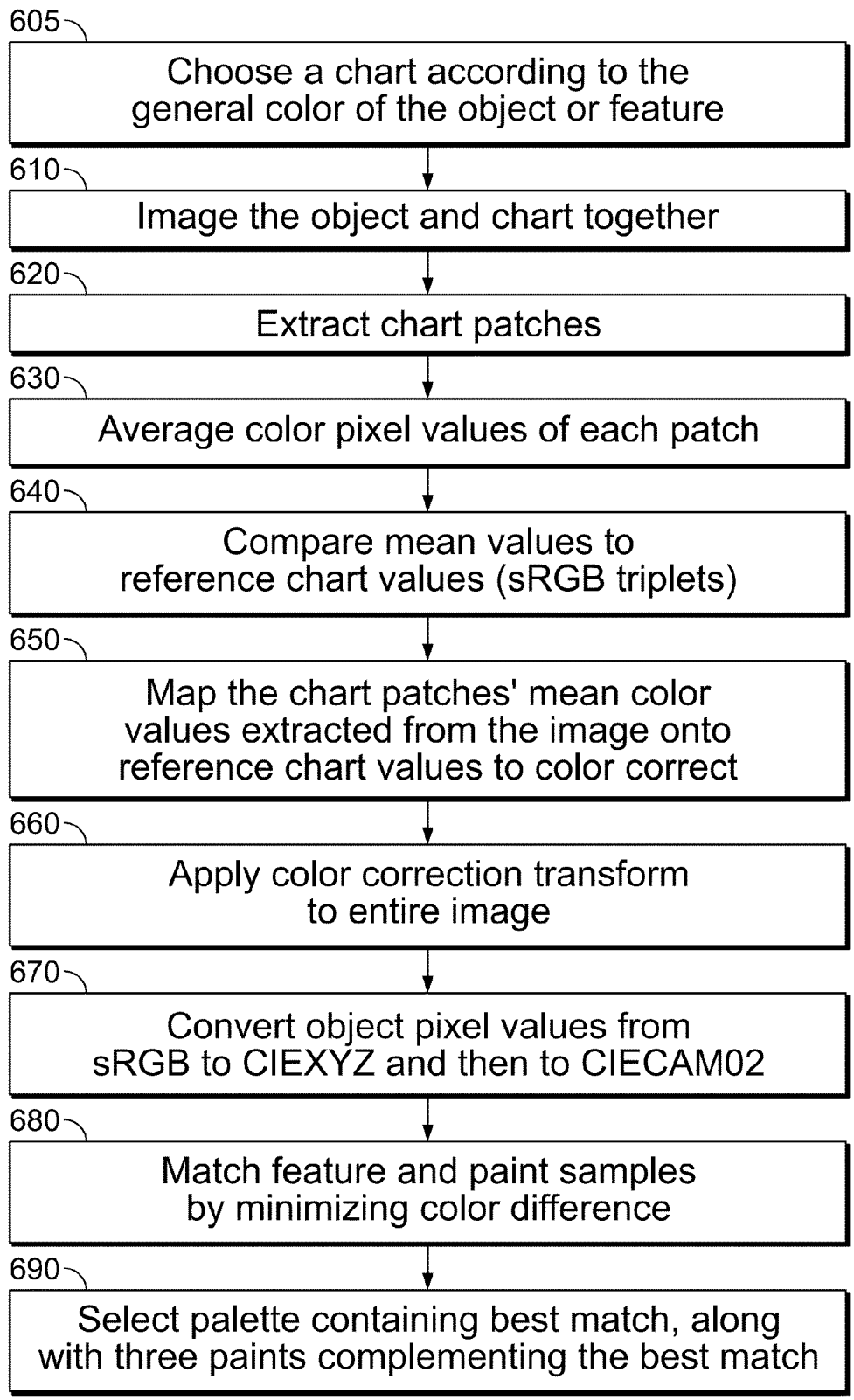
FIG. 6 is a flowchart illustrating operation of a palette selection system according to embodiments of the invention.

FIG. 6 is a flowchart illustrating a finer-grain process of a palette selection system according to embodiments of the invention. A user may choose a chart according to the general color of the object or object feature to be matched (operation 605) and then image the object and chart together (operation 610). (Operation 605 may not be needed if there is only one chart from which to choose.) The chart patches are extracted (operation 620), the color pixel values of each patch are averaged (operation 630), and their mean values are compared to reference chart values (sRGB triplets) (operation 640). A 3×4 color transform A maps the chart patches' mean color values M extracted from the image onto reference chart values T (operation 650), as follows:

$$T_{\{3\times n\}} = A_{\{3\times 4\}} \cdot M_{\{4\times n\}}, \quad (2)$$

where T is a matrix whose ith column contains the ith value of the n reference patches $t_i = (t_i^{red}, t_i^{green}, t_i^{blue})^T$ and M is a matrix whose ith column contains the ith value of the n mean camera patch color $m_i = (m_i^{red}, m_i^{green}, m_i^{blue})^T$.

To solve the equation, find A minimizing $\|T-AM\|_2$, i.e., minimizing the least mean square error in sRGB color space. A may be computed using the Moore-Penrose pseudo-inverse, denoted $^+$. Right-multiplying equation (2) by $M^+ = M^T(MM^T)^{-1}$ gives $TM^+ = AMM^+ = A$, thus $$A = TM^+ \quad (3)$$

The pseudo-inverse of M may be computed by singular value decomposition. A provides a 3×3 color transform plus a per-component offset. Image extracted sRGB values are not rounded prior to the least mean square computation to increase the precision for dark objects, i.e., those having small sRGB values. A may be recomputed for each new image and new chart and will thus differ depending on the camera characteristics, lighting conditions, and the range of colors considered. In operation 660, transform A may be applied to the entire image prior to the extraction of the object's pixels.

The spacing between the reference chart colors may be perceptually uniform. To approximately preserve this perceptual uniformity in the color correction, transform A (which is linear) may be computed in non-linear sRGB. Minimizing the least mean square error in sRGB is computationally fast and simple, and may be an accurate correction for colors that fall within the range of the reference chart colors, but not so accurate for colors that fall outside the range. The chart should thus be carefully chosen for each new object or feature, and the overall color appearance of the corrected image outside that object or feature may be poor.

After color correction, the object's or feature's pixels may be assumed to be in sRGB. In operation 670, the object or feature pixel values may be converted from sRGB to CIEXYZ and then to CIECAM02. Other color models or spaces may be used, such as CIELAB.

In operation 680, the object or feature and paint samples may be matched by minimizing their color difference. In one embodiment, the color difference in CIECAM02 may be minimized as follows. Input data for CIECAM02 includes the tristimulus values XYZ of the object or feature and of the white point $X_w Y_w Z_w$, the adapting luminance $L_A$, and the relative luminance of the surround. Viewing condition parameters may be chosen as advised for the previous model CIECAM97s when considering sRGB, as done in N. Moroney, *Usage guidelines for CIECAM97s*, Proc. of IS&T PICS Conf., pp. 164-68 (2000).

The Euclidian distance, $\Delta E_{02}$, between the object's (or feature's) and paint's CIECAM02 values, $$\Delta E_{02} = \sqrt{(J_o - J_p)^2 + 100(a_o - a_p)^2 + 100(b_o - b_p)^2}, \quad (4)$$

where "o" stands for "object" (including feature) and "p" for "paint," may be minimized. J represents the CIECAM02 lightness and a and b are the red-green and yellow-blue components, respectively. Hue h and chroma C may also be used, but J, a, and b may be simpler than hue h and chroma C. a and b are multiplied by a factor 100 to adjust to the range of lightness J. Better results may occur when using a perceptually uniform color space over a simple Euclidian distance in sRGB, but other methods work. For example, CIECAM02 may be desired over CIELAB for its better overall perceptual uniformity, especially since CIELAB shows some non-uniformity in blue hues, but CIELAB could also be used for a range of colors. In one example, the object or feature color may be compared against a collection of 63 coordinated paint palettes, each consisting of four colors, i.e., a total of 252 paints. The system then chooses the paint best matching the color of the object or feature in CIECAM02 (Eq. 4).

In operation 690, the palette is selected that contains the best matching paint and the three paints complementing the best match, hence complementing the object or object feature (see FIG. 3).

Besides the operations shown in FIG. 6, other operations or series of operations may be used to color correct and select a color palette, such as using CIELAB, CIEXYZ, sRGB or other color spaces or models or different distance minimization techniques. Moreover, the actual order of the operations in the flowchart may not be critical.

For example, in some embodiments color-corrected pixels may be extracted, a color difference between the color-corrected pixels and a database of paint samples may be minimized to find the closest matching paint, and a set of paints may be selected that complements the closest matching paint.

E. Evaluation

A home décor embodiment was evaluated against the opinions of an expert in that area, as follows. Colored objects were imaged with an HP R-967 camera under uniform fluorescent light along with a properly chosen reference color chart. Fluorescent lighting conditions are common in office environments and stores, as well as in homes with the increased use of energy-saving light bulbs.

The object database consisted of 63 samples of various colors and materials. The samples were chosen such that their colors cover most hues. The choice of beige, brown, and wood-like samples was larger (26 samples) as these colors are very common in home décor. The samples were of wood (7 samples), linoleum (8 samples), including some mimicking wood, tiles (10 samples), including two semi-transparent glass tiles, kitchen top samples (6 samples), and fabrics (32 samples). Different, textured, non-uniformly colored, and non-lambertian samples were chosen to test the system in "real" conditions. However, since the evaluated database contained only flat and relatively smooth samples, other embodiments of the method may consider the geometry of the decoration object. The database and the charts were created independently, i.e., the charts were not used as references while collecting samples.

The object CIECAM02 values were compared against the CIECAM02 values of 252 paint samples by minimizing the Euclidian distance (Eq. 4). The system picked the paint closest to the object. Paint samples were grouped in palettes of four colors. The system thus returned four colors, one matching and three complementing the object color.

The home décor expert was shown each sample along with 9 color palettes, i.e., a total of 36 paints. The expert was first asked to choose the paint out of 36 that she would pick as best match. The database of paints did not offer enough colors for her to systematically pick an optimal color. The expert was thus asked to rate her own choices. The grades went from 1 to 5 according to the following rating:

1. The sophistication of a high quality expert recommendation, perfect given the palette selections;
2. Competent work by an expert given the palette selections;
3. Close, but not perfect, typical of an untrained consumer;
4. Poor selection, other selections are much better; and
5. Terrible, unacceptable, even for a consumer.

The expert was asked to provide integer grades and keep uniform intervals between grades. After the expert made her choice, she was presented the system's results and was asked to rate them as previously. The system's and expert's results were then compared and analyzed.

The expert gave the grade 1, meaning "perfect," to 29 of the 63 paints selected by our system, while she similarly rated 47 of her own choices. The grades occurrences can be seen in FIGS. 7A and 7B. The expert's rating of the system choices is in FIG. 7A; the expert's choices themselves are in FIG. 7B. The shadings in FIG. 7B correspond to the grades of the system's choices. The system and expert top choices match for one third of the objects, but the remaining results are also good. Many different paint patches have very similar CIECAM02 values, especially in beige tones. The expert graded most of the system results 1, as right on, or 2, good for an expert. The average grades were 2.09 ($\sigma=1.34$) and 1.57 ($\sigma=1.21$) for the system and expert, respectively. These results are satisfying, but do not take into account the quality of the color correction.

Transform (color correction matrix) A maps the chart patch values extracted from an image onto reference values. This color correction can be visualized by looking at the convex hulls of the reference, image extracted, and color corrected chart values in normalized sRGB. FIGS. 8A and 8B show two examples of color correction and the corresponding chart values in sRGB. All the samples were imaged in the same conditions, but automated in-camera processing shows important variations. Under each pair of images are shown the convex hulls of the image uncorrected chart values (indicated by 810), reference chart values (indicated by 820), and image corrected chart values (indicated by 830). The reference values were calculated from the reflectance spectra of the chart, converted to sRGB. The corrected values and reference values overlap.

Due to the variety of non-lambertian and textured materials in the set, the quality of the color correction cannot be estimated using sample reflectance spectra. However, it can be estimated using the chart patches, which are known, and a "leave-one-out" cross-validation method. Each chart patch was successively corrected using a color correction transform computed from the 23 remaining patches. The error in color correction was computed as the difference between the patch image extracted normalized sRGB values after color correction and the corresponding reference values. This was done for the 24 patches extracted from the 63 images, i.e., for a total of 1512 patches. The average error in normalized sRGB chart values was 2.02% ($\sigma=1.02\%$). The equivalent error in CIECAM02 was $\Delta E_{02}=2.19$ ($\sigma=1.17$). FIG. 9 shows the color correction $\Delta E_{02}$ errors for each of the 9 charts. The bars show the standard deviation a. The error is chart dependent.

The color correction of an object is good if its color is similar to the colors in the reference chart. In other words, the color correction accuracy depends on whether the object color is located "close enough" to the volume formed by the chart values in sRGB. The chart's gamuts (i.e., footprints) may not fill the entire sRGB cube, i.e., the charts may not be optimal for all the samples. To test which samples are accurately color corrected, it may be necessary to look at the position of the object color in sRGB with respect to the convex hull of the corresponding reference chart. Used as a criterion was the difference in volume between the convex hulls of the chart points with the object color point $V_{t+o}$ and of the chart points alone V. The color correction may be classified as sufficient if the difference in volume is less than 10%, i.e., if $$\frac{V_{t+o} - V_t}{V_t} < 0.1. \quad (5)$$

Thirty-eight (38) samples satisfied the criterion. The distribution of grades among these 38 samples was as follows: 18 samples received a 1, 12 samples a 2, 3 samples a 3, 1 sample a 4, and 4 samples a 5. The remaining 25 samples were ignored for a more precise analysis in the following results. FIGS. 7A and 7B take all 63 samples into account, while FIGS. 10-11 use the 38 samples satisfying Equation 5.

This procedure may be used to provide feedback to a user to help dynamically choose the reference chart. Embodiments may test whether the object color falls within the chart gamut and indicate whether the object can be adequately color corrected. If that is not the case, the system may indicate which chart the users should employ.

The evaluation was designed to determine whether the method can provide automated color advice that an expert would consider as good. Two critical factors are the quality of the color correction and the metric used to match the objects with the paint samples. When the chart is correctly chosen according to the object's color, the color correction is "good" with an accuracy of 2.02% in sRGB. Mimicking how an expert matches the sample and paint colors can be done by minimizing the CIECAM02 distance between them. The validity of this assumption can be verified by comparing the CIECAM02 distance (Eq. 4) used by the system to assign matches with the grades the expert gave to the results. FIGS. 10A-10C are bar graphs showing differences between object and paint colors as a function of the grades given by the expert computed for the 38 samples satisfying Equation 5. The bars show the standard deviation σ. (Only one sample was graded as 4.) FIG. 10A shows that the paints that are close to the object in CIECAM02 (ΔE~5) may get the best grade 1. These figures also show that the difference in hue (a,b) (FIG. 10B) may be more critical than the difference in lightness J (FIG. 10C), larger distances Δab ($=\sqrt{\Delta a^2 + \Delta b^2}$) may correspond to poorer grades (FIG. 10B), while the distance in lightness ΔJ does not exhibit any specific relation with the expert's grades (FIG. 10C).

The above results suggest that hue plays a more important role to the expert than lightness when choosing color matches. The current metric (Eq. 4) can thus be modified to give less weight to lightness. Moreover, the CIECAM02 model defines Cartesian coordinates that may be better perceptual attributes than the approximated Cartesian coordinates 100a and 100b used in Equation 4. The Cartesian coordinates ($a_c, b_c$) for chroma are defined as $$a_c = C \cos(h) \text{ and } b_c = C \sin(h) \tag{6}$$

(see M. D. Fairchild, *Color Appearance Models*, 2nd Edition, John Wiley & Sons (2005)) where C is the chroma and h the hue angle. Another metric can be used by varying the parameter α∈[0,2] in $$\Delta E_{02}^{c,\alpha} = \sqrt{(2-\alpha)(J_o - J_p)^2 + \alpha[(a_{c,o} - a_{c,p})^2 + (b_{c,o} - b_{c,p})^2]} \tag{7}$$

in order to better match the expert method of picking color matches. When α=1, Equation 7 simply becomes $$\Delta E_{02}^{c,\alpha} = \sqrt{(J_o - J_p)^2 + (a_{c,o} - a_{c,p})^2 + (b_{c,o} - b_{c,p})^2} \tag{8}$$

Figure 11:
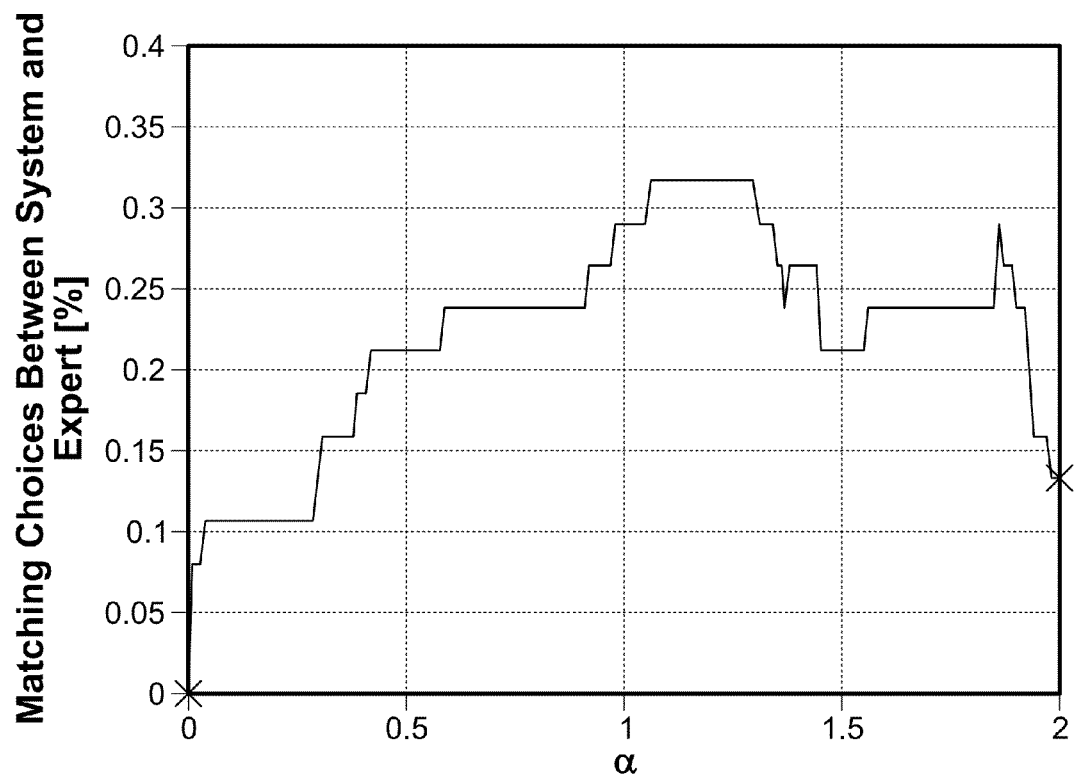
FIG. 11 shows results of an optimization in varying a metric measuring matching between an expert and embodiments of the invention.

Varying a by 0.01 steps and running the system for each α, it is possible to compute how many newly assigned paints match with the expert choices for each iteration. FIG. 11 shows the result of the optimization. Giving slightly more weight to the $a_c$ and $b_c$ components gives better results. The maximum is centered around α~1.2. The metric is optimized by weighting the lightness J with respect to ($a_c, b_c$) by varying α. The optimum is chosen as a such that the highest number of system and expert recommendations match. Looking at the two extreme cases α=0 and α=2 also shows that hue may be more important than lightness for the expert. Indeed, completely discarding the lightness (α=2) still gives some matching results, while there is no match when α=0.

In sum, a system and method are described that may be used to color correct an image and select a color palette that can be used in home décor and other applications. This may be accomplished by imaging an object with a reference color chart and then correcting the object color or an object feature based on the amount the reference colors have been affected in the image. The correction computes by least mean square estimation in sRGB a color transform that maps the scene chart color values onto pre-computed chart reference values, and then the transform is applied to the entire image. The least mean square estimation of the color correction matrix in sRGB allows a fast and computationally low-cost color correction. When the colored object or feature is within the chart colors' convex hull, its color can be corrected with an accuracy of $\Delta E_{02} \cong 2.19$ ($\Delta E^c_{02} \cong 2.03$).

Coordinated colors can be assigned to any colored object by matching the corrected object or feature color to a paint in a database by minimizing a distance between the object or feature color and the paint database (in the detailed example, minimizing a CIECAM02 distance). Results are similar to what an expert would achieve. The metric can be modified by giving more weight to hue to even better match the expert's selection.

The described embodiments allow accurate color correction and matching using uncalibrated images taken with uncalibrated cameras. The techniques can be successfully applied to home décor and other applications. Any color or feature can be corrected using a limited number of color charts.

These techniques improve over the skin classification example, in which the color values for skin color correction require a very small space in the entire color spectrum. In contrast, these techniques use a much broader color range using a color chart system that provides complete coverage by dividing the color space in color ranges, each covered by a calibration or reference chart. If the chart is roughly in the same color space as the material sample to be measured, the consumer can look at the sample and roughly approximate the color correction chart, e.g. blue-green, reds, yellows, grey, etc. to be used.

These techniques are also advantageous because they can be carried out using software downloads or via MMS, but need no special camera software, specific hardware camera quality, or a known camera (i.e., a camera with a prior device characterization or calibration). They are designed to work with the lowest quality consumer camera or camera-phone and still provide good results.

Aspects of the present invention may be embodied in the form of a system, a method, or a computer program product. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method for selecting a color palette, comprising:
   receiving a feature from an image of an object and a calibrated reference color chart, the calibrated reference color chart including reference colors and selected from among a plurality of reference charts;

calculating a transform to correct a color in the calibrated reference color chart within the image to be coordinated with or to be the closest matching shade to a corresponding reference color;

correcting a color in the feature using said transform; and from a plurality of color palettes, each color palette comprising a plurality of complementary colors, selecting the color palette having a color that most closely matches the corrected feature color.

2. The method of claim 1, wherein the selecting comprises to be coordinated with or to be the closest matching shade to the corrected feature color to a color in a database.

3. The method of claim 2, wherein the matched database color is included as part of the color palette.

4. The method of claim 1, wherein said selecting is performed using a color appearance model or color space.

5. The method of claim 1, wherein said color palette is used in decorating.

6. The method of claim 1, wherein said color palette is used in fashion or apparel.

7. The method of claim 1, further comprising providing feedback to a user to choose the reference color chart.

8. The method of claim 1, wherein said reference color chart is one of a plurality of reference color charts chosen by a user.

9. The method of claim 1, wherein said reference color chart includes color patches that are to be coordinated with or include a color spectrum.

10. A non-transitory computer-readable medium having computer-readable program code embodied therein for performing the method of claim 1.

11. A method for selecting a color palette, comprising:

extracting color-corrected pixels;

minimizing a color difference between said color-corrected pixels and a database of finish samples to find the closest matching finish; and from a plurality of sets of complementary finishes, selecting the set of complementary finishes that has a finish most closely matching the closest matching finish.

12. The method of claim 11, further comprising converting color values of said color-corrected pixels to those of another color appearance model or color space to minimize the color difference.

13. The method of claim 11, wherein minimizing the color difference comprises using a combination of lightness and hue.

14. An apparatus for selecting a color palette, comprising:

a color corrector for receiving a feature from an image of an object and a calibrated reference color chart, the calibrated reference color chart including reference colors and selected from among a plurality of reference charts, calculating a transform to correct a color in the reference color chart within the image to be coordinated with or to be the closest matching shade to a corresponding reference color, correcting a color in the feature using said transform, and generating a corrected feature color; and a palette selector for selecting, from a plurality of color palettes that each comprise a plurality of complementary colors, the color palette having a color that most closely matches the corrected feature color.

15. The apparatus of claim 14, wherein said palette selector matches the corrected feature color to a finish in a finish database.

16. The apparatus of claim 15, wherein said selected color palette is a color palette including the finish in the finish database matching the corrected feature color.

17. The apparatus of claim 14, wherein said palette selector minimizes a color difference in a color appearance model or color space between the corrected feature color and finishes in a finish database.

18. A system for selecting a color palette comprising the apparatus of claim 14 and an imaging apparatus.

19. The system of claim 18, wherein said system resides as at least part of a mobile phone or computer application.

20. A system for selecting a color palette comprising the apparatus of claim 14 and an image analyzer for analyzing an image and providing a selection of features to match.

* * * * *

UNITED STATES PATENT AND TRADEMARK OFFICE
CERTIFICATE OF CORRECTION

| | | |
|---|---|---|
| PATENT NO. | : 8,634,640 B2 | Page 1 of 1 |
| APPLICATION NO. | : 12/909378 | |
| DATED | : January 21, 2014 | |
| INVENTOR(S) | : Nina Bhatti et al. | |

It is certified that error appears in the above-identified patent and that said Letters Patent is hereby corrected as shown below:

In the Claims

In column 14, line 30, in Claim 17, before "minimizes" delete "5".

Signed and Sealed this
Thirteenth Day of May, 2014

Michelle K. Lee
*Deputy Director of the United States Patent and Trademark Office*